J. F. COURSON.
DRAFT GEAR.
APPLICATION FILED DEC. 11, 1916.
1,225,111.
Patented May 8, 1917.
2 SHEETS—SHEET 1.
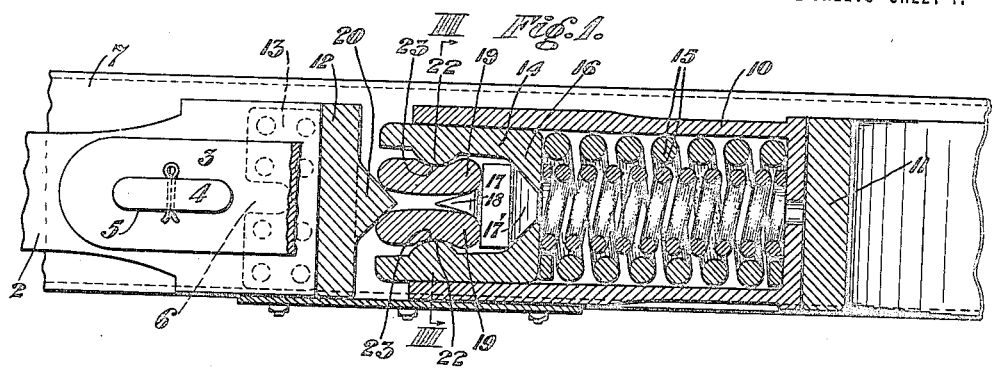
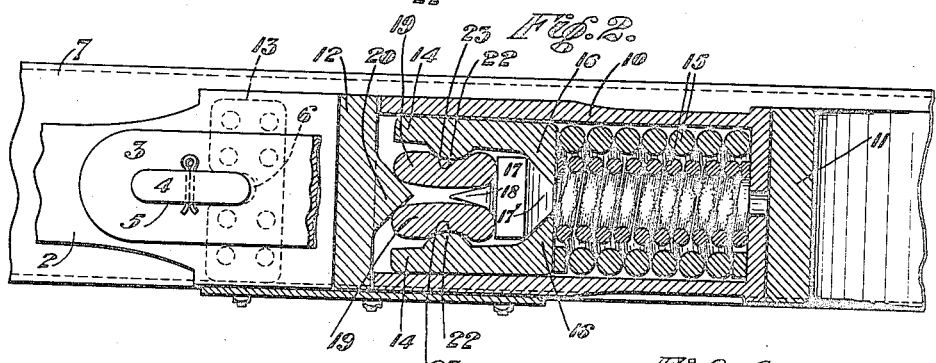
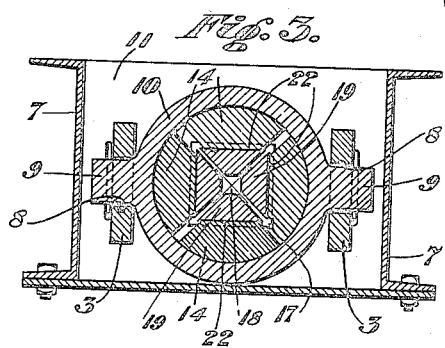
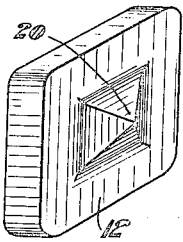
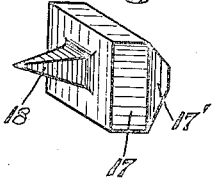
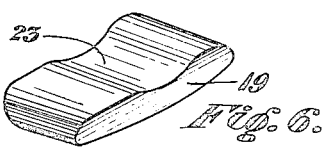
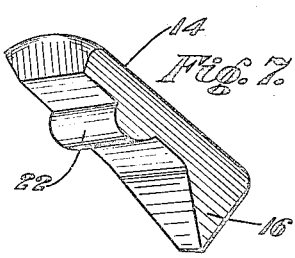
Witnesses:
Edwin Trueb
Ashley N. Bockrath
Inventor:
John F. Courson
by C. M. Clarke
his Attorney

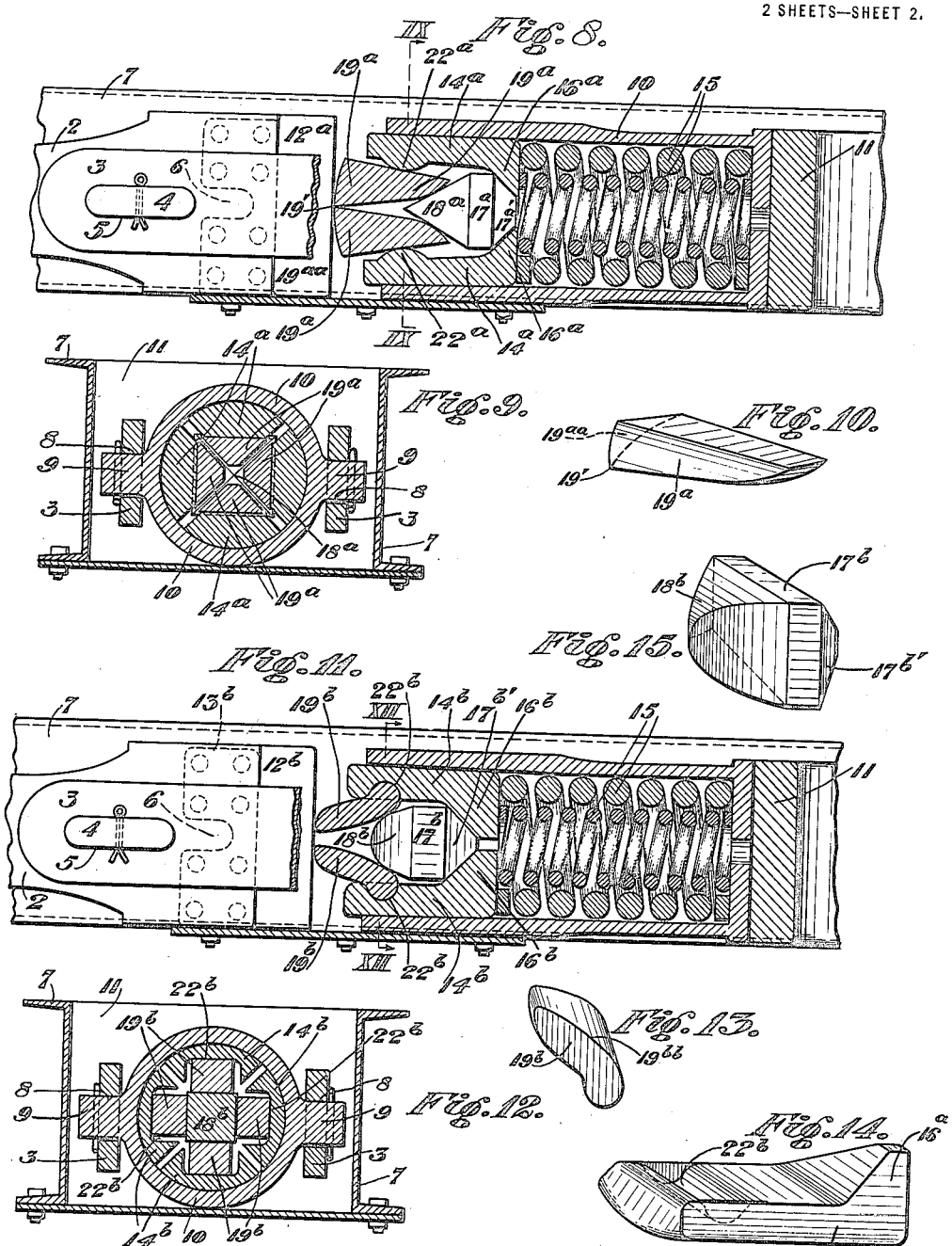

UNITED STATES PATENT OFFICE.

JOHN F. COURSON, OF PITCAIRN, PENNSYLVANIA.

DRAFT-GEAR.

1,225,111.                     Specification of Letters Patent.       Patented May 8, 1917.

Application filed December 11, 1916.  Serial No. 136,141.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention is an improvement in draft gears of the class utilizing springs and friction shoes, and expanding mechanism for the friction shoes, operable upon buffing or pulling, to effect resistance to such strains through the mechanism inclosed within an embracing cylinder or casing.

The particular objects in view are to provide, in a gear of this type, means for distending the friction shoes toward the casing with frictional engagement proportioned to the strain, utilizing wedge and lever mechanism. A further object is to provide for equal application of the frictional pressure throughout the length of the shoes.

The several objects are accomplished, in certain preferred forms of the apparatus, as more fully hereinafter described and illustrated in the accompanying drawings, in which:

Figure 1 is a longitudinal vertical sectional view through the complete gear as assembled, the parts being shown in normal extended position.

Fig. 2 is a similar view, showing the gear in compression.

Fig. 3 is a cross section on the line III, III, of Fig. 1.

Fig. 4 is a perspective detail view of the wedging follower.

Fig. 5 is a similar view of the inner fulcrum bearing wedge.

Fig. 6 is a similar view of one of the expanding levers.

Fig. 7 is a similar view of one of the friction shoes.

Fig. 8 is a view similar to Fig. 1 showing a modified construction.

Fig. 9 is a cross section on the line IX, IX, of Fig. 8.

Fig. 10 is a perspective detail view of one of the segmental portions of the composite expanding wedge of Fig. 8.

Fig. 11 is a view similar to Fig. 8 showing a further modification.

Fig. 12 is a cross section on the line XII, XII, of Fig. 11.

Fig. 13 is a perspective detail view of one of the expanding levers of Fig. 11.

Fig. 14 is a perspective view of one of the friction shoes of Fig. 11.

Fig. 15 is a perspective detail view of the inner expanding wedge of Fig. 11.

In the drawings, 2 represents the drawbar of the coupler connected with the front end portions of side links 3 by a transverse bolt or key 4, which extends through slots 5 in the front portions thereof, its ends preferably terminating within the inner faces of the center sills 7 of the car framing at each side, for longitudinal movement.

Links 3 are longitudinally slotted at their rear ends, as at 8, and engage lugs 9 of a casing or cylinder 10 mounted between the center sills 7 for limited movement in buffing.

Casing 10 is closed at its rear end and normally bears against a rear abutment 11 while a follower 12 at the front end is adapted to oppose forward movement of the casing in pulling. Said follower engages against abutment stops 13 of the center sills in forward movement under draft or pulling strains, and is receded by the rear end of drawbar 2 in buffing.

Within the casing are friction shoes 14 which bear by their inner ends against a spring or springs 15, said shoes having inwardly extending wedge portions 16, with inner wedge faces. A co-acting wedge 17 having faces 17′ engages said wedge portions 16 and operates to distend the shoes by longitudinal movement of the wedge inwardly, or of the casing outwardly. I preferably provide the forward portion of wedge 17 with a central stud or spur 18 against the base of which at each side bear the inner preferably rounded ends of a series of expanding levers 19. These levers extend forwardly and bear by their front terminals against the tapering faces of a central pyramidal wedge 20 of follower 12. Each friction shoe 14 is provided on its front inner portion with a projecting bearing boss or lug 22 and the outer engaging portion of each lever 19 is preferably slightly concaved as at 23 to provide a seat for lug 22, to insure snug fitting.

In operation, inward movement of the follower 12 in buffing, or outward movement of the casing in pulling, effects a spreading action of levers 19 due to wedge 20 and a resulting expansion of the friction shoes. At the same time the inner ends of levers 19 thrust the inner wedge 17 and its faces 17' inwardly effecting spreading of the inner ends of the friction shoes, so that they are thus expanded equally throughout their length. The resulting frictional engagement is in a ratio proportionate to the buffing or pulling strains, while the free release of the parts is insured on cessation of the strains, due to the absence of any acute angle wedges. It will be observed that the spreading action of the follower wedge, acting on the levers, multiplies the effective action of the wedge to a considerable degree.

In Fig. 8, I show a modified construction and arrangement in which I substitute wedge-shaped members $19^a$ for the distending levers 19, and which bear by their inner rounded terminals against the tapered confronting faces of a forwardly extending wedge $18^a$. This wedge element is a part of the member $17^a$, having, like wedge 17 above described, inwardly extending wedge faces $17^{a'}$ adapted to engage and distend the inwardly disposed portions $16^a$ of shoes $14^a$, as will be readily understood.

The friction shoes are provided with the inwardly extending rounded bosses $22^a$ against which bear the outer straight faces of the members $19^a$, and these members are also preferably slightly rounded on their front ends as indicated at $19^{aa}$. They abut directly against the rear continuously flat face of follower $12^a$ and are driven inwardly upon inward movement of the follower in buffing. In pulling, they are resisted by the face of the follower, and with either movement they effect a spreading action of the friction shoes throughout their entire length, due to the wedging action. Members $19^a$, being segmental-shaped in cross-section, as indicated in Fig. 10, converge at a common meeting point by their inner forward terminals 19' and lie closely adjacent in an assembled or nested position, providing a composite wedging lever member. In action, each particular member of the composite series, like levers 19, is capable of automatic adjustment while accommodating itself to the other parts, providing sufficient flexibility in the entire structure to insure against any lost motion or mis-application of power.

The other parts of the gear are similar to those above described and similarly indicated by numerals having the exponent "a".

In Fig. 11, I show a still further modified form in which the construction and arrangement of the parts is generally similar to that above described, except that the members $19^b$ bear by their inner rounded terminals in corresponding rounded recesses or sockets $22^b$, and by their forward ends abut directly against the rear flat face of follower $12^b$. Wedge member $17^b$ is provided with the inner wedge faces $17^{b'}$ as already described, engaging the inner portions of the friction shoes $14^b$, and said member extends forwardly by a truncated pyramidal extension $18^b$ as shown. This extension is preferably rounded somewhat as to each of its converging faces, as shown in Fig. 15, and each face bears against the inner rounded face $19^{bb}$ of lever member $19^b$.

In action, the friction shoes are distended, either in buffing or pulling, by the spreading effect of the faces of extension $18^b$ against the lever members, their outer ends bearing directly against the follower and resulting in a high degree of developed outward pressure, somewhat in the manner of a toggle joint, which pressure is transmitted to the friction shoes. The other parts of the gear are similar to those already described and indicated by corresponding numerals having the exponent "b".

Having described my invention, what I claim is:

1. A draft gear consisting of a casing, friction shoes within the casing, a wedge adapted to distend the friction shoes, a draw bar and follower in operative relation to the casing, and lever members between said wedge and the follower engaging and adapted to exert a radial pressure on the friction shoes.

2. A draft gear consisting of a casing, friction shoes within the casing having inwardly extending wedge portions at their rear ends, a wedge engaging said portions, a drawbar and follower in operative relation to the casing, and lever members engaging said wedge, follower, and friction shoes respectively, and operable to exert a radial pressure on the friction shoes.

3. A draft gear consisting of a casing, friction shoes within the casing having interior rounded bearing portions, a wedge adapted to distend the friction shoes, a drawbar and follower in operative relation to the casing, and lever members engaging said wedge and follower and the rounded bearing portions of the friction shoes respectively.

4. In combination, a casing, friction shoes within the casing, a distending wedge therefor having oppositely disposed supporting portions, a drawbar and follower in operative relation to the casing, and lever members engaging said wedge, follower and friction shoes respectively, and operable to exert a radial pressure on the friction shoes.

5. In combination, a casing, friction shoes within the casing, a distending wedge therefor having a lever bearing portion, a follower having an inwardly extending wedge, a drawbar in operative relation to the casing and follower, and lever members engaging said wedges and the friction shoes respectively.

6. In combination, a casing, friction shoes within the casing, a distending wedge therefor having a lever bearing portion, lever members engaging the friction shoes and wedge, a follower coacting with said lever members and wedge to separate the lever members, a drawbar engaging the follower and connected with the casing, and a spring within the casing engaging the friction shoes.

7. A draft gear consisting of a casing, friction shoes within the casing having inwardly extending wedge portions at their rear ends, a centrally arranged wedge engaging said portions, lever members engaging the friction shoes and said wedge and operable to exert a radial pressure on the friction shoes, a drawbar connected with the casing, and a resisting element interposed between the drawbar and said levers.

8. A draft gear consisting of a casing, friction shoes within the casing having inwardly extending wedge portions at their rear ends, a centrally arranged wedge engaging said portions, separable lever members engaging the friction shoes and said wedge, a drawbar connected with the casing, and a resisting wedge member interposed between the drawbar and said levers.

In testimony whereof I hereunto affix my signature.

JOHN F. COURSON.